(12) United States Patent
Challener et al.

(10) Patent No.: US 9,341,532 B2
(45) Date of Patent: May 17, 2016

(54) SYSTEMS AND METHODS FOR DISTRIBUTED PRESSURE SENSING

(71) Applicant: General Electric Company, Schenectady, NY (US)

(72) Inventors: William Albert Challener, Niskayuna, NY (US); Glen Peter Koste, Niskayuna, NY (US); Sachin Narahari Dekate, Niskayuna, NY (US); Sabarni Palit, Guilderland, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 14/222,757

(22) Filed: Mar. 24, 2014

(65) Prior Publication Data

US 2015/0268117 A1     Sep. 24, 2015

(51) Int. Cl.
| | | |
|---|---|---|
| *G01B 11/16* | (2006.01) | |
| *G01L 11/02* | (2006.01) | |
| *E21B 47/06* | (2012.01) | |
| *G01D 5/353* | (2006.01) | |

(52) U.S. Cl.
CPC .............. *G01L 11/025* (2013.01); *E21B 47/06* (2013.01); *G01D 5/3538* (2013.01); *G01D 5/35312* (2013.01)

(58) Field of Classification Search
CPC .............................. G01L 11/025; E21B 47/06
See application file for complete search history.

(56) References Cited

U.S. PATENT DOCUMENTS

| | | | |
|---|---|---|---|
| 4,380,948 A * | 4/1983 | Loving et al. ................ | 86/20.15 |
| 5,317,576 A | 5/1994 | Leonberger et al. | |
| 5,671,307 A | 9/1997 | Lauzon et al. | |
| 5,706,079 A | 1/1998 | Kersey | |
| 5,760,391 A | 6/1998 | Narendran | |
| 5,892,781 A * | 4/1999 | Pan et al. .......................... | 372/6 |
| 5,905,745 A | 5/1999 | Grubb et al. | |

(Continued)

FOREIGN PATENT DOCUMENTS

| | | |
|---|---|---|
| WO | 2011120147 A1 | 10/2011 |
| WO | 2013185813 A1 | 12/2013 |

OTHER PUBLICATIONS

Zhao et al., "Simultaneous Measurement of Down-Hole High Pressure and Temperature With a Bulk-Modulus and FBG Sensor", IEEE Photonics Technology Letters, vol. No. 14, Issue No. 11, pp. 1584-1586, Nov. 2002.

Bohnert et al., "Polarimetric Fiber Laser Sensor for Hydrostatic Pressure", Applied Optics, vol. No. 43, Issue No. 1, pp. 41-48, Jan. 1, 2004.

(Continued)

*Primary Examiner* — Kara E Geisel
*Assistant Examiner* — Hina F Ayub
(74) *Attorney, Agent, or Firm* — The Small Patent Law Group LLC; Joseph F. Harding (57) ABSTRACT

A pressure sensing cable in one embodiment includes a polarization maintaining (PM) optic fiber having a length; and a Fiber Bragg Grating (FBG) pair formed in the PM optic fiber. The FBG pair includes a first FBG formed at a location along the length of the optic fiber. The first FBG defines a first wavelength range at which the first FBG is reflective. The FBG pair also includes a second FBG spaced a distance from the first FBG to define a FBG cavity extending between the first FBG and the second FBG. The second FBG defines a second wavelength range at which the second FBG is reflective. The first wavelength range of the first FBG and the second wavelength range of the second FBG at least partially overlap.

12 Claims, 5 Drawing Sheets

(56) References Cited

U.S. PATENT DOCUMENTS

| | | | |
|---|---|---|---|
| 6,016,702 | A | 1/2000 | Maron |
| 6,058,226 | A | 5/2000 | Starodubov |
| 6,278,811 | B1 | 8/2001 | Hay et al. |
| 6,422,084 | B1 | 7/2002 | Fernald et al. |
| 6,597,821 | B1 | 7/2003 | Bohnert et al. |
| 6,820,489 | B2 | 11/2004 | Fernald et al. |
| 6,885,784 | B2 | 4/2005 | Bohnert |
| 6,901,187 | B2 | 5/2005 | Haroud et al. |
| 7,251,023 | B2 * | 7/2007 | Bohnert ................ G01D 5/344 356/73.1 |
| 7,266,261 | B2 | 9/2007 | Vidal et al. |
| 7,840,102 | B2 | 11/2010 | Boyd |
| 7,889,332 | B2 * | 2/2011 | Omichi ................ G01B 11/18 250/225 |
| 7,940,389 | B2 | 5/2011 | Rogers et al. |
| 8,380,021 | B2 | 2/2013 | Rambow |
| 8,417,084 | B2 | 4/2013 | Stoesz et al. |
| 8,634,681 | B2 | 1/2014 | Rogers |
| 8,849,073 | B2 * | 9/2014 | Vigneaux ........................ 385/13 |
| 2006/0013534 | A1 | 1/2006 | Bohnert et al. |
| 2013/0070235 | A1 | 3/2013 | Chen et al. |
| 2013/0314694 | A1 * | 11/2013 | Tchoryk et al. .............. 356/28.5 |

OTHER PUBLICATIONS

Pissadakis et al., "Inscription of Bragg Reflectors in All-Silica Microstructured Optical Fibres Using 248nm, Picosecond and Femtosecond Laser Radiation", Proceedings of SPIE, vol. No. 6990, Photonic Crystal Fibers II, pp. 69900H-1-69900H-11, Apr. 21, 2008.

Wang et al., "Multiplexed Fiber-Optic Pressure and Temperature Sensor System for Down-Hole Measurement", IEEE Sensors Journal, vol. No. 8, Issue No. 11, pp. 1879-1883, Nov. 2008.

Guan et al., "Bragg Gratings in Pure-Silica Polarization-Maintaining Photonic Crystal Fiber", IEEE Photonics Technology Letters, vol. No. 20, Issue No. 23, pp. 1980-1982, Dec. 1, 2008.

Wu et al., "Side-Hole Photonic Crystal Fiber With Ultrahigh Polarimetric Pressure Sensitivity", Journal of Lightwave Technology, vol. No. 29, Issue No. 7, pp. 943-948, Apr. 1, 2011.

Singlehurst et al., "A Distributed Pressure Measurement System Comprising Multiplexed In-Fibre Bragg Gratings Within a Flexible Superstructure", Journal of Lightwave Technology, vol. No. 30, Issue No. 1, pp. 123-129, Jan. 1, 2012.

PCT Search Report and Written Opinion issued in connection with corresponding Application No. PCT/US2015/019082 on Jul. 2, 2015.

* cited by examiner

SYSTEMS AND METHODS FOR DISTRIBUTED PRESSURE SENSING

BACKGROUND

Various devices have been developed for measuring environmental conditions of a given location, such as temperature or pressure. However, numerous locations present challenges to many of these devices. For example, many devices may not be appropriate for use in higher temperature environments, such as geothermal wells, oil wells, or the like.

Certain conventional down-hole sensing techniques (e.g., for oil, gas, or geothermal applications) use distributed strain, temperature, and/or acoustic sensing. Pressure sensing along the length of a cable (or along the depth of a well or hole) may be performed using separately packaged sensors that are spliced along a length of a cable. For example, hydrostatic pressure may be transduced into longitudinal strain along an axis of the sensor, with the longitudinal strain used in determining pressure. However, the process of packaging and splicing sensors along a cable places practical limits on the numbers of pressure sensors along the length of the cable. The splicing of sensors into the cable and/or the use of transduced axial strain increases the cost, complexity, and/or instrumentation of distributed pressure sensing. Conventional approaches may also provide reduced resolution and/or present additional or alternative drawbacks.

BRIEF DESCRIPTION

In one embodiment, a pressure sensing cable is provided including a polarization maintaining (PM) optic fiber having a length and a Fiber Bragg Grating (FBG) pair formed in the PM optic fiber. The FBG pair includes a first FBG formed at a location along the length of the optic fiber. The first FBG defines a first wavelength range at which the first FBG is reflective. The FBG pair also includes a second FBG spaced a distance from the first FBG to define a FBG cavity extending between the first FBG and the second FBG. The second FBG defines a second wavelength range at which the second FBG is reflective. The first wavelength range of the first FBG and the second wavelength range of the second FBG at least partially overlap.

In another embodiment, a measurement system is provided including a pressure sensing cable, a signal unit, and a processing unit. The pressure sensing cable includes a polarization maintaining (PM) optic fiber having a length and plural Fiber Bragg Grating (FBG) pairs formed along the length of the optic fiber. Each FBG pair includes a first FBG pair member and a second FBG pair member. The first FBG pair member is formed at a location along the length of the optic fiber, and defines a first wavelength range at which the first FBG pair member is reflective. The second FBG pair member is spaced a distance from the first FBG pair member to define a FBG cavity extending between the first FBG pair member and the second FBG pair member. The second FBG pair member defines a second wavelength range at which the second FBG pair member is reflective. The first wavelength range of the first FBG pair member and the second wavelength range of the second FBG pair member of each pair at least partially overlap with each other but not with wavelength ranges of members of other FBG pairs. The signal unit is operably coupled to the pressure sensing cable and configured to transmit an optic signal to the pressure sensing cable. The processing unit is configured to receive a return signal responsive to the optic signal transmitted to the pressure sensing cable. The processing unit is also configured to identify a portion of the return signal corresponding to each FBG pair based on the wavelength ranges of the members of each FBG pair. Further, the processing unit is configured to determine, using the portion of the return signal corresponding to each FBG pair, a pressure corresponding to the portion of the return signal identified for each FBG pair.

In another embodiment, a method for measuring pressure at distributed locations is provided. The method includes transmitting, using a signal unit, an optic signal to a pressure sensing cable. The pressure sensing cable includes a polarization maintaining (PM) optic fiber having a length and plural Fiber Bragg Grating (FBG) pairs formed along the length of the optic fiber. Each FBG pair includes a first FBG pair member and a second FBG pair member. The first FBG pair member is formed at a location along the length of the optic fiber and defines a first wavelength range at which the first FBG pair member is reflective. The second FBG pair member is spaced a distance from the first FBG pair member to define a FBG cavity extending between the first FBG pair member and the second FBG pair member. The second FBG pair member defines a second wavelength range at which the second FBG pair member is reflective. The first wavelength range of the first FBG pair member and the second wavelength range of the second FBG pair member of each pair at least partially overlap with each other but not with wavelength ranges of members of other FBG pairs. The method also includes obtaining, at a processing unit, a return signal from the pressure sensing cable responsive to the optic signal transmitted using the signal unit. Further, the method includes identifying, using the processing unit, a portion of the return signal corresponding to each FBG pair based on wavelength. Also, the method includes determining, using the processing unit, a pressure corresponding to each FBG pair using the corresponding portion of the return signal for each FBG pair.

DETAILED DESCRIPTION

Various embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors, controllers or memories) may be implemented in a single piece of hardware (e.g., a general purpose signal processor or random access memory, hard disk, or the like) or multiple pieces of hardware. Similarly, any programs may be stand-alone programs, may be incorporated as subroutines in an operating system, may be functions in an installed software package, and the like. It should be understood that the various embodiments are not limited to the arrangements and instrumentality shown in the drawings.

As used herein, the terms "system," "unit," or "module" may include a hardware and/or software system that operates to perform one or more functions. For example, a module, unit, or system may include a computer processor, controller, or other logic-based device that performs operations based on instructions stored on a tangible and non-transitory computer readable storage medium, such as a computer memory. Alternatively, a module, unit, or system may include a hard-wired device that performs operations based on hard-wired logic of the device. The modules or units shown in the attached figures may represent the hardware that operates based on software or hardwired instructions, the software that directs hardware to perform the operations, or a combination thereof. The hardware may include electronic circuits that include and/or are connected to one or more logic-based devices, such as microprocessors, processors, controllers, or the like. These devices may be off-the-shelf devices that are appropriately programmed or instructed to perform operations described herein from the instructions described above. Additionally or alternatively, one or more of these devices may be hard-wired with logic circuits to perform these operations.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Generally, various embodiments provide for distributed pressure sensing along a seamless, spliceless cable. For example, in various embodiments, Fiber Bragg Grating (FBG) pairs are formed in an optic fiber (e.g., a silica optic fiber), with each FBG pair defining a selectively reflective FBG cavity between the members of the FBG pair, and with the FBG pairs distributed along the length of the optic fiber. The fiber is birefringent (e.g., having a refractive index that depends on the polarization and propagation direction of light), and the birefringence of the fiber is hydrostatic pressure dependent. The reflections of light from the FBG cavities thus provide a pressure dependent signal that may be read, for example, with an optical or electronic spectrum analyzer or other device, and used to determine a pressure (e.g., hydrostatic pressure from a surrounding environment) for each FBG pair, and thus used to determine pressure at various locations along the length of the cable. Distributed pressure along the length of the cable (e.g., at various depths in a down-hole or well in which the cable is disposed) may be used, for example, to monitor fluid levels, to identify or monitor flows, to identify or monitor leaks and/or obstructions, and/or to determine a phase (e.g., gas or liquid) of a substance surrounding the cable.

At least one technical effect of various embodiments is providing for the measurement of pressure distributions at various points (e.g., a pressure map) in a remote location (e.g., a well or down-hole). At least one technical effect of various embodiments is reduction or elimination of separate packaging and/or splicing of individual sensors to a cable or fiber. At least one technical effect of various embodiments is providing for simplified instrumentation for distributed pressure measurements. At least one technical effect of various embodiments is improved convenience and/or accuracy for pressure readings at points distributed along a length of a cable (e.g., depth of a well).

Figure 1:
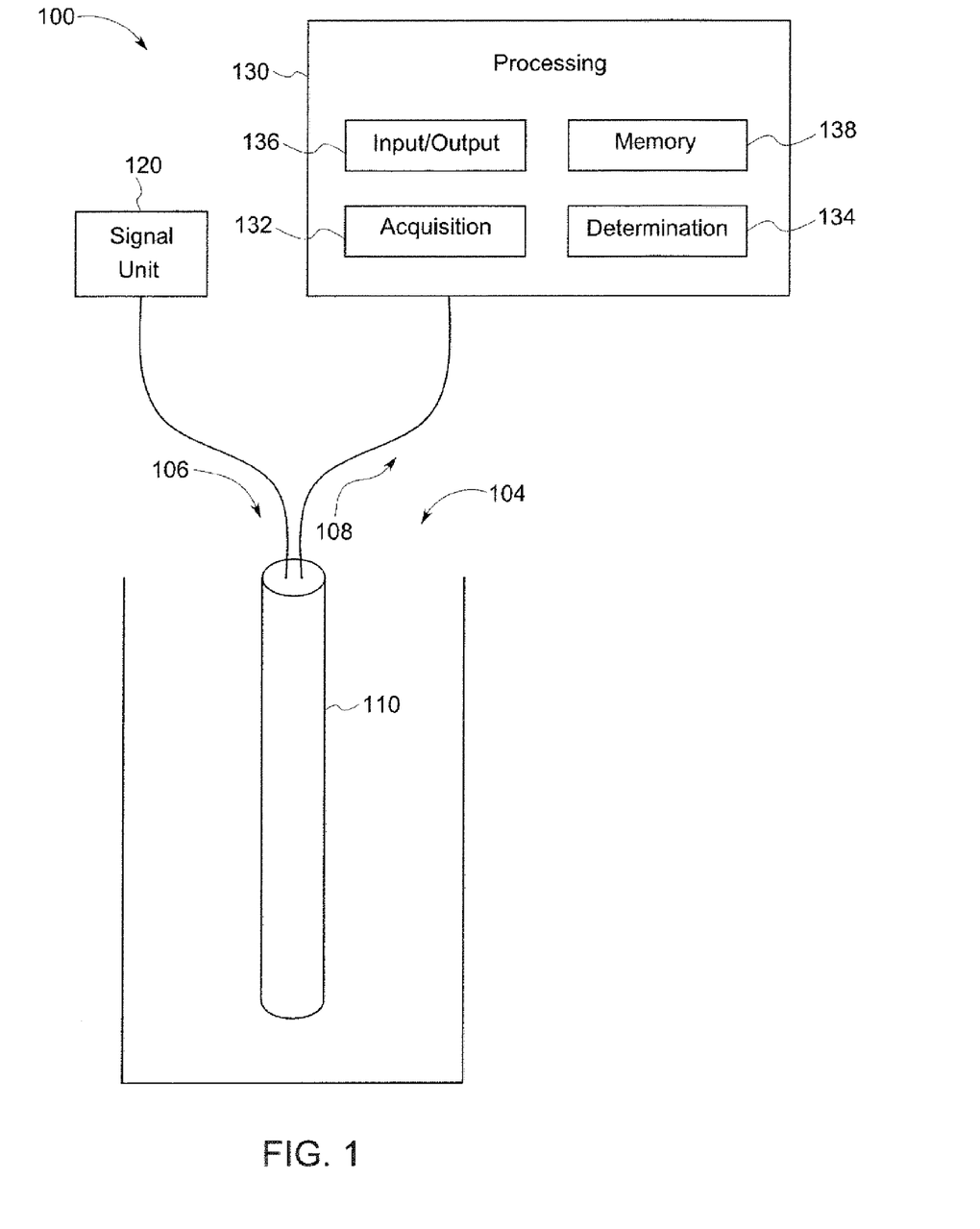
FIG. 1 is a schematic block diagram of a measurement system in accordance with various embodiments.

FIG. 1 is a schematic view of a measurement system 100 formed in accordance with various embodiments. The measurement system 100 is configured to measure one or more environmental conditions of a remote location 104. In the illustrated embodiment, the measurement system 100 is configured to measure or determine the pressure of the remote location 104. The remote location 104 may be subject to environmental conditions that may be damaging to certain electronic equipment, such as thermocouples. For example, the remote location 104 may be a geothermal well, oil well, or gas well, among others. As one more example, the remote location may be a wellbore used in conjunction with hydraulic fracturing. The remote location 104 depicted in FIG. 1 is shown as having a generally vertical configuration for clarity and ease of illustration; however, for example, in various embodiments, the remote location may also have horizontally oriented portions or volumes. The remote location 104 may be understood as being remote in that the remote location 104 is located at a distance from components of the measurement system 100 configured to generate and/or receive a signal from sensing equipment disposed within the remote location 104. Thus, signal generation and/or signal processing equipment, for example, may be maintained under different environmental conditions than the remote location 104.

The measurement system 100 depicted in FIG. 1 includes a pressure sensing cable 110, a signal unit 120, and a processing unit 130. The signal unit 120 and processing unit 130 are operably connected to the pressure sensing cable 110. Generally, in various embodiments, the signal unit 120 is configured to generate a send signal 106 that is transmitted to the pressure sensing cable 110. The send signal 106, for example, may be an optic signal including light across a bandwidth of wavelengths. In some embodiments, the send signal 106 may be a tunable laser signal. The pressure sensing cable 110 may include an optic fiber that receives the send signal 106. The send signal 106 is transmitted through the pressure sensing cable 110, with a return signal 108 generated within the pressure sensing cable 110 responsive to the send signal 106. The return signal 108 may include reflections of the send signal 106. The pressure sensing cable 110 is configured so that the return signal 108 includes portions associated with various lengths (e.g., depths in a vertical application) distributed along a length of the pressure sensing cable 110. The processing unit 130 is configured to obtain (e.g., receive) the return signal 108, identify the portions of the return signal 108 associated with particular locations along the pressure sensing cable 110, and determine a pressure for each particular location based on the corresponding identified portion of the return signal 108. For example, as discussed in further detail herein, plural locations along the pressure sensing cable 110 may be configured to have a wavelength dependent reflectivity, with each location defining a particular different, unique, or signature associated band of wavelengths. Thus, the portion of the return signal 108 occupied by the particular band of wavelengths associated with a given location may be identified as corresponding to the given location, and the identified portion analyzed to determine the pressure for the given location. In the illustrated embodiment, the pressure sensing cable 110 is shown disposed vertically within the remote location 104, while the signal unit 120 and the processing unit 130 are disposed at a distance from the remote location 104. Thus, only the pressure sensing cable 110 is subject to the environmental conditions of the remote location 104, while the signal unit 120 and the processing unit 130 are not.

In various embodiments, the pressure sensing cable 110 may include a polarization maintaining (PM) fiber optic cable with Fiber Bragg Gratings (FBG's) formed therein. A FBG may be understood as a type of reflector formed in an optic fiber that reflects certain wavelengths and transmits other wavelengths. A FBG may be formed by creating variations in the refractive index of a fiber (e.g., in the fiber core), for example using an ultraviolet (UV) laser on a photosensitive fiber. Because the FBG's are formed in the pressure sensing cable, splicing of separate sensors into the cable is not required, and the pressure sensing cable 110 may be understood as including a generally continuous fiber (e.g., a fiber without seams or splices). A FBG may be understood as having a selective reflectivity, such that a given FBG is highly reflective over a relatively small band of wavelengths, but highly transmissive over others. The FBG's may be arranged to define at least one FBG pair having first and second FBG's that have at least partially overlapping reflective wavelength bands, with the FBG pair defining a reflective cavity between the members of the pair.

Figure 2:
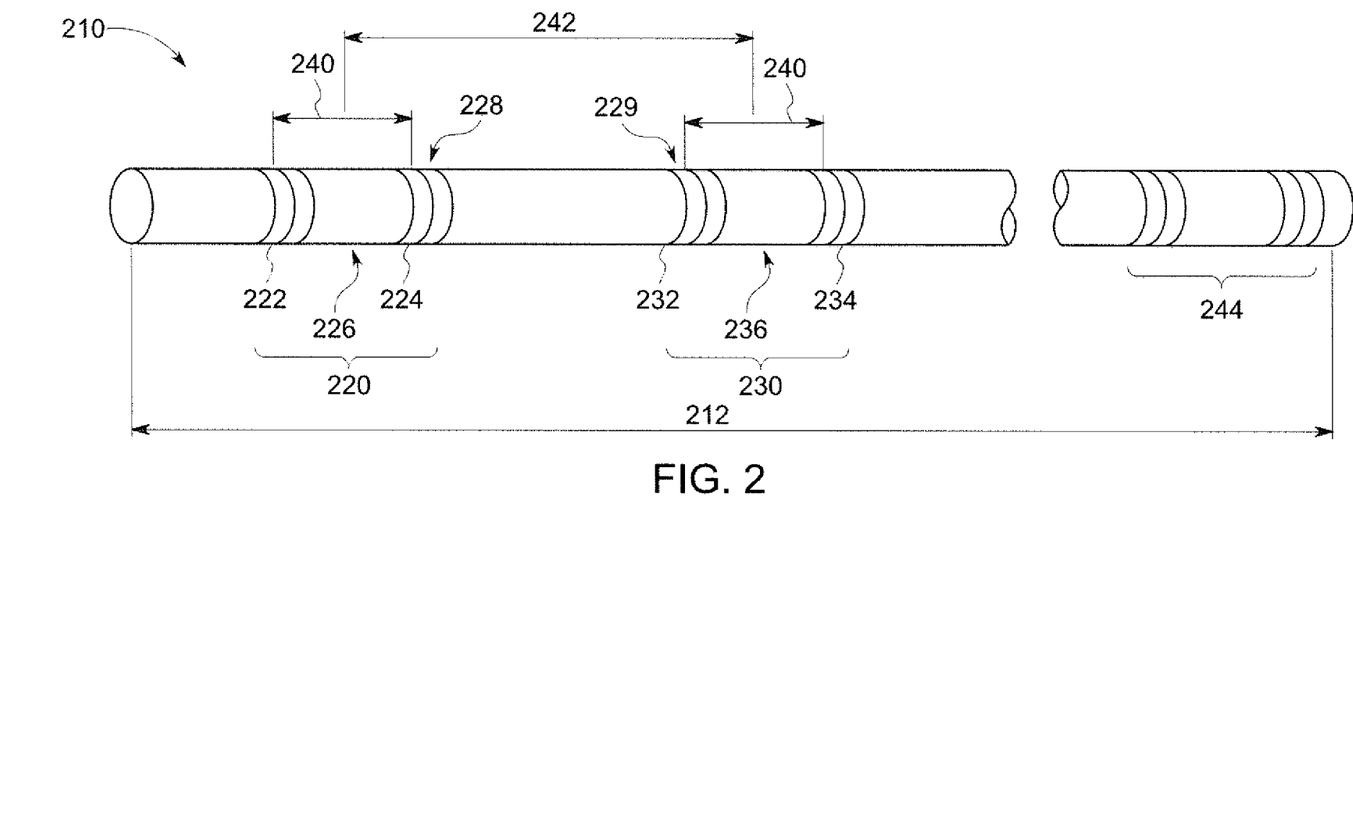
FIG. 2 is a schematic diagram of a sensing cable in accordance with various embodiments.
Figure 3:
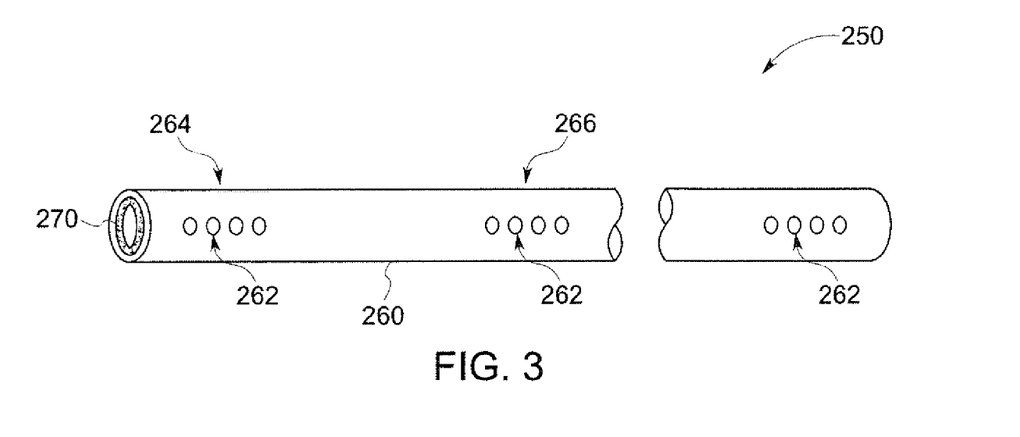
FIG. 3 is a view of a protective sleeve for the sensing cable of FIG. 2 in accordance with various embodiments.
Figure 4:
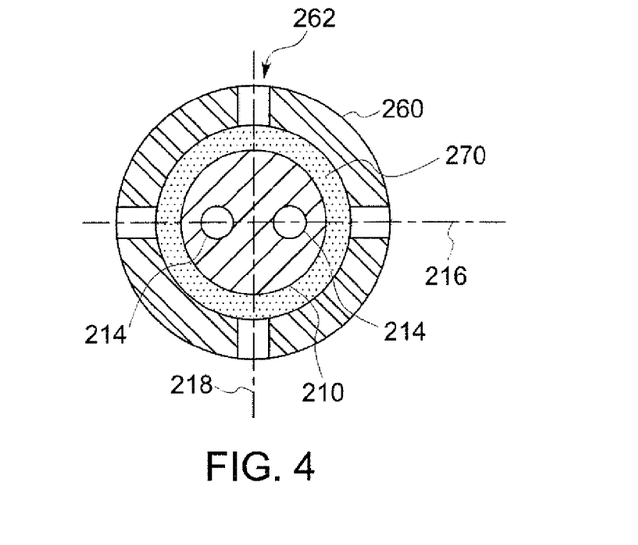
FIG. 4 is a sectional view of the sensing cable of FIG. 2 and the protective sleeve of FIG. 3.

For example, FIGS. 2-4 illustrate an example cable system 200 formed in accordance with various embodiments. The cable system 200, or portions or aspects thereof, may be employed to form the pressure sensing cable 110 in various embodiments. The depicted cable system 200 includes a PM optic fiber 210 (see FIG. 2 and FIG. 4) and a protective sleeve 250 (see FIG. 3 and FIG. 4). As seen in FIG. 4, the PM optic fiber 210 may be disposed within the protective sleeve 250. The protective sleeve 250 is configured to protect the PM optic fiber 210 from environmental conditions (e.g., of the remote location 104) while permitting selective exposure of the PM optic fiber for sensing of at least one parameter of the environment, such as pressure.

As best seen in FIG. 2, the PM optic fiber 210 includes a first FBG pair 220, a second FBG pair 230, and a third FBG pair 244. The PM optic fiber 210 has a length 212, with FBG pairs distributed along the length. Each FBG pair defines a corresponding location at which pressure may be sensed along the length 212 of the PM optic fiber 210. Only three FBG pairs are shown in FIG. 2; however, other numbers of FBG pairs may be employed in various embodiments. For example, in some embodiments, only one FBG pair may be employed. In other embodiments, up to ten or more FBG pairs may be employed. The FBG pairs may be spaced at generally regular or constant intervals in some embodiments, while FBG pairs in other embodiments may be irregularly spaced. The length 212 varies for different embodiments. For example, in some embodiments, the length 212 may be about 100 meters, with FBG pairs located about every 10 meters. In other embodiments, the length 212 may be, for example, about 1 kilometer or about 2 kilometers.

Each FBG pair of the illustrated embodiment includes two members defining a FBG cavity therebetween. Each member of a given FBG pair is reflective over a wavelength range which at least partially overlaps with the wavelength range over which the other member of the given FBG pair is reflective, but does not overlap with other members of other FBG pairs. The overlapping wavelength ranges correspond to a signature bandwidth at which the given FBG cavity is reflective, producing an identifiable portion in the return signal corresponding to the given FBG cavity and associated FBG pair. In the illustrated embodiment, birefringence in the PM optic fiber 210 is localized by the FBG cavities, and the measurement of beat frequencies of the FBG cavities may be used to determine corresponding pressures. As used herein, birefringence may be understood as a refraction of light in an anisotropic material in two different directions to form two rays, and/or as an optic property of a material having a refractive index that depends on the polarization and propagation direction of light.

As shown in FIG. 2, the first FBG pair 220 includes a first FBG 222 and a second FBG 224. The first FBG 222 and the second FBG 224 are spaced a FBG spacing distance 240 apart. For example, in some embodiments, the first FBG 222 and the second FBG 224 may be on the order of several millimeters long, and the FBG spacing distance 240 may between about 0.5 centimeters and about 1.0 centimeters. Other spacings and/or FBG sizes may be employed in alternate embodiments. The first FBG 222 and the second FBG 224 define a first FBG cavity 226 therebetween. The first FBG 222 defines a first wavelength range (or bandwidth) at which the first FBG 222 is reflective (with the first FBG 222 transmissive at other wavelengths). For example, the first FBG 222 may be, in various embodiments, about 99% reflective over the first wavelength range, about 90% reflective over the first wavelength range, or about 70% reflective over the first wavelength range, among others. Similarly, the second FBG 224 defines a second wavelength range at which the second FBG 224 is reflective (with the second FBG 224 transmissive at other wavelengths). For example, the second FBG 224 may be, in various embodiments, about 99% reflective over the second wavelength range, about 90% reflective over the second wavelength range, or about 70% reflective over the second wavelength range, among others. Further, the first and second wavelength ranges overlap, with the first FBG cavity thus producing observable variations in the light reflected and/or transmitted through the PM optic fiber 210 over the overlapping portion of the first and second wavelength ranges. For example, the first FBG 222 may define a reflective wavelength range of about 3 nanometers, the second FBG 224 may define a reflective wavelength range of about 3 nanometers, and the first FBG cavity 226 may define a bandwidth of about 3 nanometers or less, depending on the overlap of the first and second wavelength ranges. In some embodiments, about 90% or more of the second wavelength range may overlap with the first wavelength range.

As also shown in FIG. 2, the second FBG pair 230 includes a third FBG 232 and a fourth FBG 234. The first FBG 222 and the fourth FBG 234 are spaced a FBG spacing distance 240 apart. For example, in some embodiments, the third FBG 232 and the fourth FBG 234 may be on the order of several millimeters long, and the FBG spacing distance 240 may between about 0.5 centimeters and about 1.0 centimeters. Other spacings and/or FBG sizes may be employed in alternate embodiments. The third FBG 232 and the fourth FBG 234 define a second FBG cavity 236 therebetween. The third FBG 232 defines a third wavelength range (or bandwidth) at which the third FBG 232 is reflective (with the third FBG 232 transmissive at other wavelengths). For example, the third FBG 232 may be, in various embodiments, about 99% reflective over the first wavelength range, about 90% reflective over the first wavelength range, or about 70% reflective over the first wavelength range, among others. Similarly, the fourth FBG 234 defines a fourth wavelength range at which the fourth FBG 234 is reflective (with the fourth FBG 234 transmissive at other wavelengths). For example, the second FBG 222 may be, in various embodiments, about 99% reflective over the second wavelength range, about 90% reflective over the second wavelength range, or about 70% reflective over the second wavelength range, among others. Further, the third and fourth wavelength ranges overlap, with the first FBG cavity thus producing observable variations in the light reflected and/or transmitted through the PM optic fiber 210 over the overlapping portion of the first and second wavelength ranges.

However, the third and fourth wavelength ranges of the illustrated embodiment do not overlap with the first wavelength range (of the first FBG 222) or the second wavelength range (of the second FBG 224). For example, the third FBG 232 may define a reflective wavelength range of about 3 nanometers, the fourth FBG 234 may define a reflective wavelength range of about 3 nanometers, and the second FBG cavity 236 may define a bandwidth of about 3 nanometers or less, depending on the overlap of the first and second wavelength ranges. In some embodiments about 90% or more of the fourth wavelength range may overlap with the third wavelength range.

Thus, the first FBG pair 220 (and associated first FBG cavity 226) corresponds to a particular wavelength of the return signal, and the second FBG pair 230 (and associated second FBG cavity 236) corresponds to a different particular wavelength of the return signal. Further, the location of the FBG pairs along the length 212 of the PM optic fiber 210 are known. For example, the first FBG pair is located at a first location 228, and the second FBG pair is located at a second location 229. The first location 228 and the second location 229 are separated by a distance 242. The locations and distance therebetween may be based, for example, on the centers of the FBG cavities. The distance 242 may be greater than the FBG spacing distance 240 (the spacing between the members of a FPG pair) by one or more orders of magnitude in some embodiments. For example, the FBG spacing distance 240 may be between about 0.5 centimeters and about 1.0 centimeters, and the distance 242 between FBG pairs may be about 10 meters, about 20 meters, about 50 meters, or about 100 meters, among others.

As each FBG pair/cavity is associated with a particular location and each FBG pair/cavity is also associated with a particular bandwidth of the return signal, the particular bandwidth of the return signal associated with a given FBG pair/cavity may be associated with the particular location associated with the given FBG pair/cavity. Thus, a pressure determined for a particular bandwidth (e.g., using a reflectance dip separation observed within the particular bandwidth) may be associated with a specific location along the length 212 of the PM optic fiber 210. By using a known position of the PM optic fiber 210 in a remote location, the pressure at a given portion of the remote location may be determined, based on a corresponding location along the length 212 of the PM optic fiber 210.

The third FBG pair 244 (and other pairs (not shown)) may be generally similar in certain respects to the first FBG pair 220 and the second FBG pair 230, with the members of each FBG pair having reflective wavelength ranges that overlap with each other but not with members of other pairs, so that each FBG pair/cavity has a particular wavelength band associated therewith. Thus, in the return signal, the portion of the return signal attributable to each FBG pair (and associated FBG cavity) is apparent in a different portion of the bandwidth of the return signal, so that information in the return signal corresponding to each particular FBG pair (and associated FBG cavity and associated location along the length) may be identified based on wavelength.

The PM optic fiber 210 is configured to have birefringence that varies with pressure. Thus, the birefringence at different points (e.g., at points corresponding to the FBG pairs/cavities) along the length 212 of the PM optic fiber 210 may be used to determine the pressures at the different points along the length 212 of the PM optic fiber 210. For example, in the illustrated embodiment, the PM optic fiber 210 is a polarization maintaining photonic crystal fiber including internal openings extending along the length 212 of the PM optic fiber 210. As best seen in FIG. 4, the depicted PM optic fiber 210 includes two internal openings 214 extending along the length 212 of the PM optic fiber 210, with the PM optic fiber including a slow axis 216 and a fast axis 218. It may be noted that, in some embodiments, a microstructured fiber may have dozens or even hundreds of small holes through the cross-section, for example to increase compressibility. The PM optic fiber is birefringent, so that the light signal transferred between the FBG members of a given pair is polarized, and with polarized components of the light signal having different effective path lengths to traverse from one member of the given FBG pair to the other member. Over the reflective bandwidth of the given FBG cavity (corresponding to the overlapping reflective wavelength ranges of the members of the given FBG pair forming the FBG cavity), there may be one or more dips in the reflectance at specific wavelengths in the spectrum associated with each polarization. The wavelength difference between dips of opposite polarization may vary with changes in pressure. If the light source illuminating the FBGs has a wavelength range or linewidth that extends across the wavelength range between two or more of these reflectance dips of opposite polarizations, and if the dips are sufficiently narrow in linewidth and separated by a relatively small wavelength difference, then the signal from the detector may exhibit a modulated output voltage or current at a frequency that is equal to the difference in optical frequency between the two dips. This is referred to herein as a "beat frequency." The beat frequency may be between about 10 kHz and about 100 GHz, and may be measured directly, for example, with an RF spectrum analyzer. If the wavelength separation between dips in reflectance is larger, then an optical spectrum analyzer or wavemeter, for example, may be used to directly measure the spectral separation between the dips rather than detecting a beat frequency as described above. As another example, a tunable laser with a very narrow linewidth that is less than the wavelength spacing between two of these dips of opposite polarization may be controlled to scan across the wavelength range between these dips while the reflected signal intensity is measured by a detector in order to determine the wavelength separation between the dips. These provide three different example techniques for measuring the wavelength separation between the dips. The wavelength separation between the dips may vary with changes in pressure. Thus, by exposing the portion of the PM optic fiber corresponding to a FBG cavity to a pressure (e.g., a radial pressure exerted against the PM optic fiber), a measurable or quantifiable change in the signal associated with the FBG cavity (e.g., a change in beat frequency observed within the wavelength range or bandwidth corresponding to the FBG cavity) may be identified and used to determine a corresponding pressure.

By determining the pressure at each FBG pair/cavity along the length 212 of the PM optic fiber 210, a pressure distribution of a remote location (e.g., well) in which the PM optic fiber 210 is disposed may be determined. For example, the PM optic fiber 210 may be calibrated under known conditions, and changes in the signal from the known conditions may be used to determine a change in pressure from the known condition. It may be noted that changes in the components of the signal for the different polarizations may tend to move or shift in the same direction for temperature change, so that pressure changes may be identified by polarization components shifting in opposite directions. Further, the change in reflectance dip separation for example, may be adjusted for changes in temperature, axial strain, or the like when determining the pressure.

With particular reference to FIGS. 3 and 4, the protective sleeve 250 of the illustrated embodiment includes an outer shell 260 and an inner material 270. The outer shell 260 may be substantially rigid and provide protection to the PM optic fiber 210. The depicted outer shell 260 may include holes 262 located proximate hole locations 264 and 266. In some embodiments, a fiber inside a steel cable may be surrounded by a material with high bulk modulus (e.g., a very incompressible fluid), with the pressure transmitted to the glass fiber through the fluid without the use of holes in the metal cable. In the illustrated embodiment, the hole location 264 corresponds to the first location 228, and the hole location 266 corresponds to the second location 229. The holes 262 extend through the thickness of the outer shell 260 and are configured to expose portions of the PM optic fiber 210 located proximate the hole locations 264, 266 to the pressure exerted by the remote location in which the cable system 200 is located. For example, the holes 262 of the hole location 264 allows the pressure in the remote location to act upon the first FBG pair 220, and the holes 262 of the hole location 266 allows the pressure in the remote location to act upon the second FBG pair 230.

The inner material 270 is disposed between the outer shell 260 and the PM optic fiber 210. The inner material 270 is formed from a deformable material that transmits the pressure from the remote environment to the PM optic fiber 210. The inner material 270 may be formed, as examples, from a gel or plastic. The particular inner material 270 chosen for a given application may be selected to be sufficiently solid or have a viscosity such that the inner material 270 will not escape through the holes 262, and so that the inner material may stand up to the conditions (e.g., temperature, pressure, and the like) of the remote environment. The effect of the inner material 270 and/or placement of the holes 262 may be established or measured during calibration of the cable system 200 and used during determination of the pressures for the various locations along the length 212 of the PM optic fiber 210. Thus, the protective sleeve acts to protect the PM optic fiber 210 from the conditions of the remote location, while still allowing the detection of pressure at locations along the length 212 of the PM optic fiber 210.

Returning to FIG. 1, the signal unit 120 is operably coupled to the pressure sensing cable 110 and is configured to transmit a signal (e.g., send signal 106) to the pressure sensing cable 110. The signal unit 120 in various embodiments may be configured to transmit an optic signal covering a bandwidth that includes the reflective bandwidths of one or more FBG pairs of the pressure sensing cable 110. For example, in some embodiments, the signal unit 120 may be configured to generate and transmit a tunable laser signal. The laser signal may be tuned to cover the various reflective bandwidths of FBG cavities of the pressure sensing cable 110 in various embodiments. As another example, the signal unit 120 may be configured to provide a multimode laser (e.g., a laser with multiple spectral peaks). As another example, in some embodiments, the signal unit 120 may be configured to generate and transmit a broadband optic signal, with the bandwidth of the optic signal including the various reflective bandwidths of FBG cavities of the pressure sensing cable 110. As one more example, in some embodiments, the signal unit 120 may include a super luminescent emitting diode (SLED) and be configured to transmit an optic signal from the SLED to the pressure sensing cavity. It may be noted the signal unit 120 and the processing unit 130 are depicted as separate and discrete entities in FIG. 1; however, in various embodiments, aspects of the signal unit 120 and the processing unit 120 may be shared and/or commonly accessed. Further, in some embodiments, the signal unit 120 and the processing unit 130 may be combined into a single unit or device.

In the illustrated embodiment, the processing unit 130 is configured to receive a return signal (e.g., return signal 108) generated in the pressure sensing cable responsive to the optic signal (e.g., send signal 106) transmitted by the signal unit 120. The processing unit 130 is also configured to identify a portion of the return signal corresponding to each FBG pair based on the wavelength ranges of the members of each FBG pair. For example, the processing unit 130 may have information describing, depicting, or corresponding to the particular reflective wavelength ranges of each FBG pair of a sensing cable operably coupled to the processing unit 130 stored in a memory or otherwise accessible by the processing unit 130. Based on the identified wavelength ranges, the processing unit 130 may associate particular portions of the return signal 108 with corresponding FBG pairs/cavities (and/or locations associated with the corresponding FBG pairs/cavities). Further, in the illustrated embodiment, the processing unit is configured to determine, using the portion of the return signal 108 corresponding to each FBG pair, a pressure corresponding to the portion of the return signal 108 identified for each FBG pair. In various embodiments, the processing unit 130 may determine a reflectance dip separation for each portion of the return signal 108 identified and associated with a particular FBG pair. Then, for example, by using the difference between the reflectance dip separation and at least one predetermined value of reflectance dip separation at a known condition (e.g., pressure), along with a predetermined relationship correlating the change in reflectance dip separation with the change in pressure, the pressure for each FBG pair/cavity (and/or associated location) may be determined by the processing unit 130. With the location of each particular FBG pair/cavity known, the pressure determined for each particular FBG pair/cavity may be understood as the pressure for the corresponding location for each FBG pair/cavity.

Thus, it may be noted that, in some embodiments, each FBG pair has a signature wavelength range corresponding to the overlap of ranges for each member of the FBG pair. The processing unit 130 may identify the portion of the return signal for each pair, then compare one or more aspects of the signal (e.g., reflectance dip separation) for each wavelength range to a calibration value (or otherwise use a calibration formula or table) to determine pressure for each FBG pair. In some embodiments, the processing unit 130 may be configured to correct for temperature or other factors as well when determining the pressure. By determining the pressure for each FBG pair, the processing unit 130 may determine the pressure distribution at various locations along the length of the pressure sensing cable 110.

In the illustrated embodiment, the processing unit includes an acquisition unit 132, a determination unit 134, an input/display unit 136, and a memory 138. It may be noted that the particular units or modules shown in FIG. 1 are meant by way of example, and that other arrangements of units or sub-units of the processing unit 130 may be employed in various embodiments.

Generally, in the illustrated embodiment, the acquisition unit 132 is configured to obtain (e.g., receive, acquire, or the like) information from the pressure sensing cable 110 disposed in the remote location 104. In various embodiments, the information may be provided via a return signal 108 from the pressure sensing cable 110 corresponding to reflections of the send signal 106 transmitted to the pressure sensing cable 110 from the signal unit 120. The acquisition unit 132 may be configured to filter (e.g., remove noise) or otherwise process the received return signal 108 in various embodiments. In some embodiments, the acquisition unit 132 may be configured for use with a tunable laser. In some embodiments, the acquisition unit 132 may include a spectrometer. If the reflectance dip separation is small enough, in some embodiments, a radiofrequency (RF) detector may be used. The various portions of the return signal may be obtained simultaneously or concurrently in some embodiments, and sequentially in others.

In the illustrated embodiment, the determination unit 134 obtains (e.g., receives, acquires, or the like) information (e.g., the return signal 108, or portions of the return signal 108, either processed or raw in various embodiments) from the acquisition unit 132, and determines the pressure at various locations of the remote location 104 using the received information. For example, in some embodiments, the determination unit 134 may be configured to identify portions of the return signal 108 corresponding to each particular FBG pair, and determine the pressure for each FBG pair using a predetermined calibrated relationship between one or more characteristics, properties, or aspects of the portion of the signal (e.g., reflectance dip separation) and one or more corresponding characteristics, properties or aspects of a known, calibrated value. For example, a measured or determined reflectance dip separation may be compared to a reflectance dip separation at a known pressure. The predetermined calibrated relationship may be experimentally determined for the pressure sensing cable 110. Generally, the predetermined calibrated relationship may be configured to use one or more characteristics, properties, or aspects of a portion of the return signal 108 (e.g., reflectance dip separation determined for a particular bandwidth associated with a particular FBG pair), and to provide pressure as an output. In various embodiments, the predetermined calibrated relationship may have a general type or form that corresponds to a type (e.g., model number or other specific configuration) of pressure sensing cable 110, with various constants determined for each individual pressure sensing cable 110. The predetermined calibrated relationship may be expressed as a formula, and/or may be defined by a look-up table stored by or otherwise accessible to the processing unit 130.

For example, in one example scenario, a particular design or configuration of pressure sensing cable 110 (e.g., describing one or more of a particular length of cable, distribution of FBG pairs, sizing and/or spacing of members of FBG pairs, material used to form the pressure sensing cable 110, techniques used to form the members of the FBG pairs, or the like) may have a general formula or formulae specifying the relationship between pressure and beat frequency. For example, the pressure for a given beat frequency may be given by $P=C_1+C_2*(f_{obs}-f_{cal})$, where P is pressure, $C_1$ and $C_2$, are constants, $f_{obs}$ is the observed beat frequency and $f_{cal}$ is a beat frequency. For example, $C_1$ may be the pressure at which $f_{cal}$ was observed. In various embodiments, adjustments for temperature or other factors may be utilized. In various embodiments, the constants may vary by individual pressure sensing cable while the functions remain the same for a given type or model of pressure sensing cable, while, in other embodiments, the constants and functions (e.g., coefficients of one or more functions) may vary by individual sensor. It should be noted that the above formulae are provided by way of example only, and that there may be other (e.g., more complicated or complex) forms or types of relationships between beat frequency or wavelength separation and pressure. In some embodiments, the general form for a type or model of pressure sensing cable may be determined by experimental calibration of a prototype. It may be noted that, depending on the configuration of the FBG pairs, the calibration relationship for the FBG pairs may be the same, or, in various embodiments, one or more FBG pairs may have a calibration relationship that differs from one or more other FBG pairs.

Figure 5:
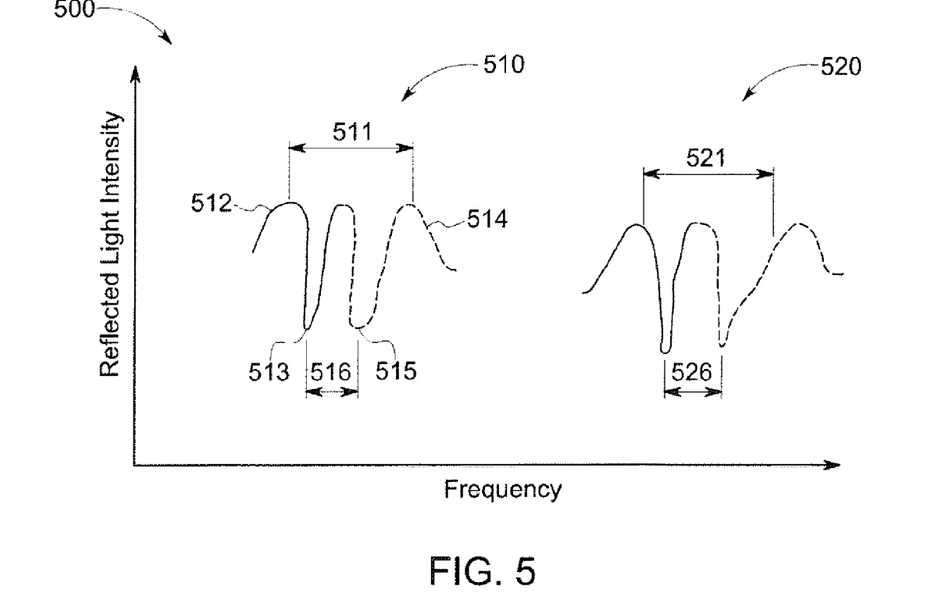
FIG. 5 is a graph of an example reflected light spectrum of a FBG cavity showing at least two dips in reflectance due to opposite polarizations that are separated by a specific wavelength difference.

As indicated above, the determination unit 134 may be configured to identify one or more characteristics, properties, or aspects of an identified portion of the return signal 108 to determine the pressure for a location corresponding to a FBG pair associated with the identified portion of the return signal. For example, the determination unit 134 may be configured to identify a beat frequency or separation between two reflectance dips of opposite polarization or their separation in wavelength. FIG. 5 illustrates an example of determination of a separation between two reflectance dips.

FIG. 5 is a graph representing reflected light over various bandwidths illustrating a separation between reflectance dips in accordance with various embodiments. In FIG. 5, a graph 500 includes a vertical axis corresponding to reflected light (e.g., intensity of light reflected from FBG cavities in a fiber optic cable) and a horizontal axis corresponding to frequency. Portions of a return signal (e.g., return signal 108) corresponding to FBG pairs/cavities are shown in the graph 500. In the illustrated embodiment, a first portion 510 and a second portion 520 are depicted. The first portion 510 extends over a first bandwidth 511 that corresponds to the reflective bandwidth of a first FBG pair (e.g., first FBG pair 220), and the second portion 520 extends over a second bandwidth 521 that corresponds to the reflective bandwidth of a second FBG pair (e.g., second FBG pair 230). As seen in FIG. 5, the bandwidths for the FBG pairs do not overlap with each other, so that each particular FBG pair (and/or associated FBG cavity) may be associated with a particular portion of the signal defined by range of frequencies or bandwidth.

The first portion 510 includes a first polarization component 512 (which, for example, may correspond to a slow axis of a fiber) and a second polarization component 514 (which, for example, may correspond to a fast axis of a fiber). The second polarization component 514 is shown as a dashed line, and the first polarization component 512 is shown as a solid line for clarity. Each component may extend further than shown, but the components are shown terminating at a common point proximate the center of the bandwidth for ease of illustration. Each polarization component 512, 514 includes a corresponding dip, or local minimum, 513, 515 in reflected light. The dip in reflected light for the different polarization components differs due to birefringence of the fiber, with portions of the signal traversing the fast and slow axis covering different effective signal path lengths between the FBG members forming the FBG cavity. The difference in the dips 513, 515 in the illustrated embodiment defines a first reflectance dip separation 516. The reflectance dip separation 516 varies with pressure due to pressure dependent birefringence of the fiber, and thus may be used to determine pressure for the first portion 510, for the FBG pair corresponding to the first portion 510, for the location along the length of the fiber corresponding to the FBG pair, and for the portion of the remote location corresponding to the location along the length of the fiber. The second portion 520 may be generally similar to the first portion 510; however the second portion 520 extends over a different, second bandwidth, and has a reflectance dip separation 526 corresponding to the pressure experienced by the FBG pair associated with the second portion 520. As the bandwidths for the various portions of the return signal do not overlap, the reflectance dip separation for a given bandwidth may be used to determine the pressure for the FBG pair associated with the given bandwidth. Thus, different pressures distributed along the length of a fiber may be determined using a single send signal and a single return signal.

Returning to FIG. 1, in the illustrated embodiment, the input/output unit 136 is configured to receive one or more inputs, for example, from a user, and to display information to a user, for example, values of beat frequencies, pressure distributions along the length of the pressure sensing cable 110 or at locations within the remote location 104 as determined by the processing unit 130, prompts to assist in the entry of information, or the like. The input/output unit 136 may include one or more of a touchscreen, keyboard, mouse, keypad, or the like. For example, a user may input a model number or other designator for a type of pressure sensing cable to be used, which may be used to determine the relationship (or form of relationship for use with calibration coefficients) between pressure and one or more signal characteristics (e.g., reflectance dip separation or beat frequency) to be used by the processing unit 130 to determine pressures along the length of the pressure sensing cable 110. In some embodiments, a user may input particular calibration constants for an individual pressure sensing cable via the input/output unit 136. The input/output unit 136 may also be configured to automatically or autonomously retrieve information regarding calibration information or the like for a given pressure sensing cable via a database accessible to the input/output unit.

Figure 6:
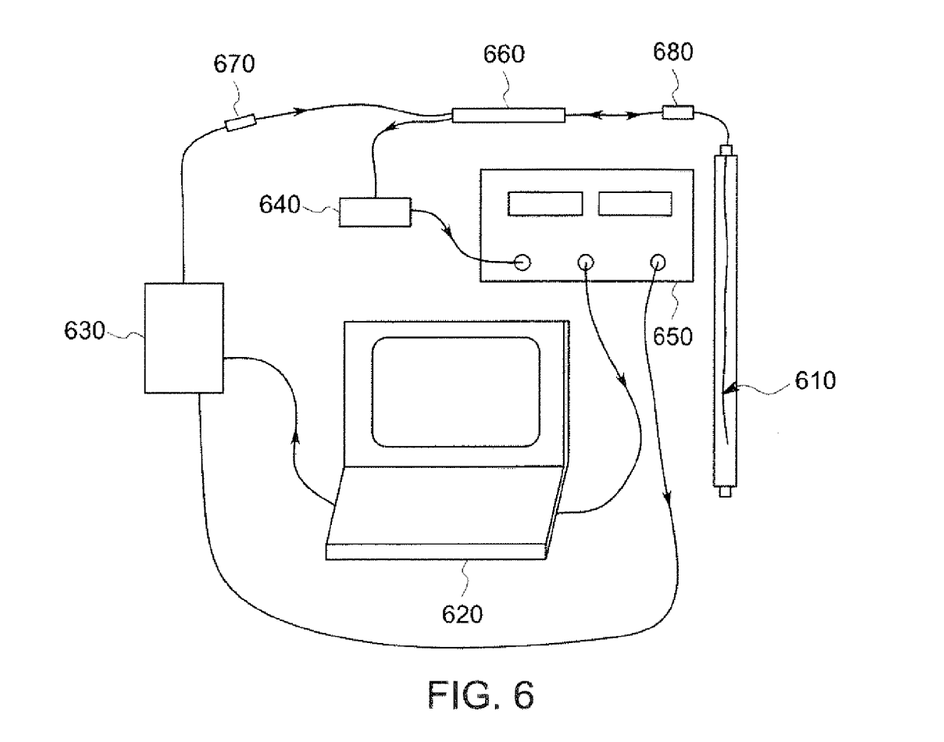
FIG. 6 is a schematic view of a pressure measurement system in accordance with various embodiments.

FIG. 6 illustrates an example of a system 600 configured to transmit an optic signal (e.g., send signal 106) to a pressure sensing cable (e.g., pressure sensing cable 110), to receive a signal (e.g., return signal 108) from the pressure sensing cable, and to process the received signal to determine pressures at one or more locations along a length of the pressure sensing cable. The system 600 includes a pressure sensing cable 610, a laptop unit 620, a tunable laser 630, a detector 640, a lock-in amplifier 650, a circulator 660, a coupler 670, and a coupler 680. The pressure sensing cable 610 may be configured generally similarly to the pressure sensing cable 110 and/or cable system 200 discussed herein. As seen in FIG. 6, the laptop unit 620 is used in conjunction with both sending an optic signal to the pressure sensing cable 610 as well as receiving and analyzing a return signal from the pressure sensing cable 610.

In the illustrated embodiment, an output wavelength of the tunable laser 630 is controlled by the laptop unit 620. For example, the laptop unit 620 may scan the laser in increments of about 1 picometer. The intensity of the laser may be sinusoidally modulated at a reference frequency supplied by the lock-in amplifier 650. Light from the tunable laser 630 is provided to the circulator 660 via the coupler 670. Light is then provided from the circulator 660 to the pressure sensing cable 610 via the coupler 680. The light then enters the pressure sensing cable 610, passing through the pressure sensing cable 610 (e.g., through FBG cavities as described herein within the pressure sensing cable 610).

Light reflected (e.g., by the FBG cavities) is then routed from the pressure sensing cable 610, via the circulator 660, to the detector 640. The detector 640 may be configured as a spectral detector. For example, in various embodiments, the detector 640 may include an Indium-Gallium-Arsenide (InGaAs) detector configured to cover a wavelength range including the bandwidths of the FBG cavities of the pressure sensing cable 610. An output from the detector 640, for example an output voltage, may be fed into the lock-in amplifier 650 for synchronous detection and measurement. In various embodiments, the laptop unit 620 may be configured to scan the wavelength of the laser 630, collect a signal reading from the lock-in amplifier 650 as the laptop unit 620 scans the wavelength of the laser 630, and plot the spectrum of light reflected from one or more FBG cavities of the pressure sensing cable 610. Further, the laptop unit 620 may be configured to determine the pressure for the FBG cavities using the signal received from the lock-in amplifier (e.g., by calculating pressure based on a beat frequency or wavelength separation determined from reflectance dips due to opposite polarizations in the reflectance spectrum for each FBG cavity), to identify locations (e.g., depths in a well in which the pressure sensing cable 610 is disposed) corresponding to the FBG cavities, associate the pressures of the FBG cavities with the locations corresponding to the FBG cavities, and display the determined pressure for each location. Thus, the system 600 may be used to tune a laser to scan across the various reflective bandwidths of the FBG pairs/cavities to acquire the corresponding portions of a return signal (e.g., 108) associated with the FBG pairs/cavities.

Thus, in various embodiments, pressure readings distributed along a length of a pressure sensing cable may be obtained. The pressure sensing cable may be generally continuous (e.g., may be devoid of seams or splices). The pressure readings may be made without requiring transduction to convert from hydrostatic pressure to longitudinal strain for sensors, as in certain conventional systems. Further, the need for separate packaging of sensors and/or splicing may be reduced and/or eliminated. In some embodiments, the instrumentation associated with distributed pressure measurements may be simplified.

Figure 7:
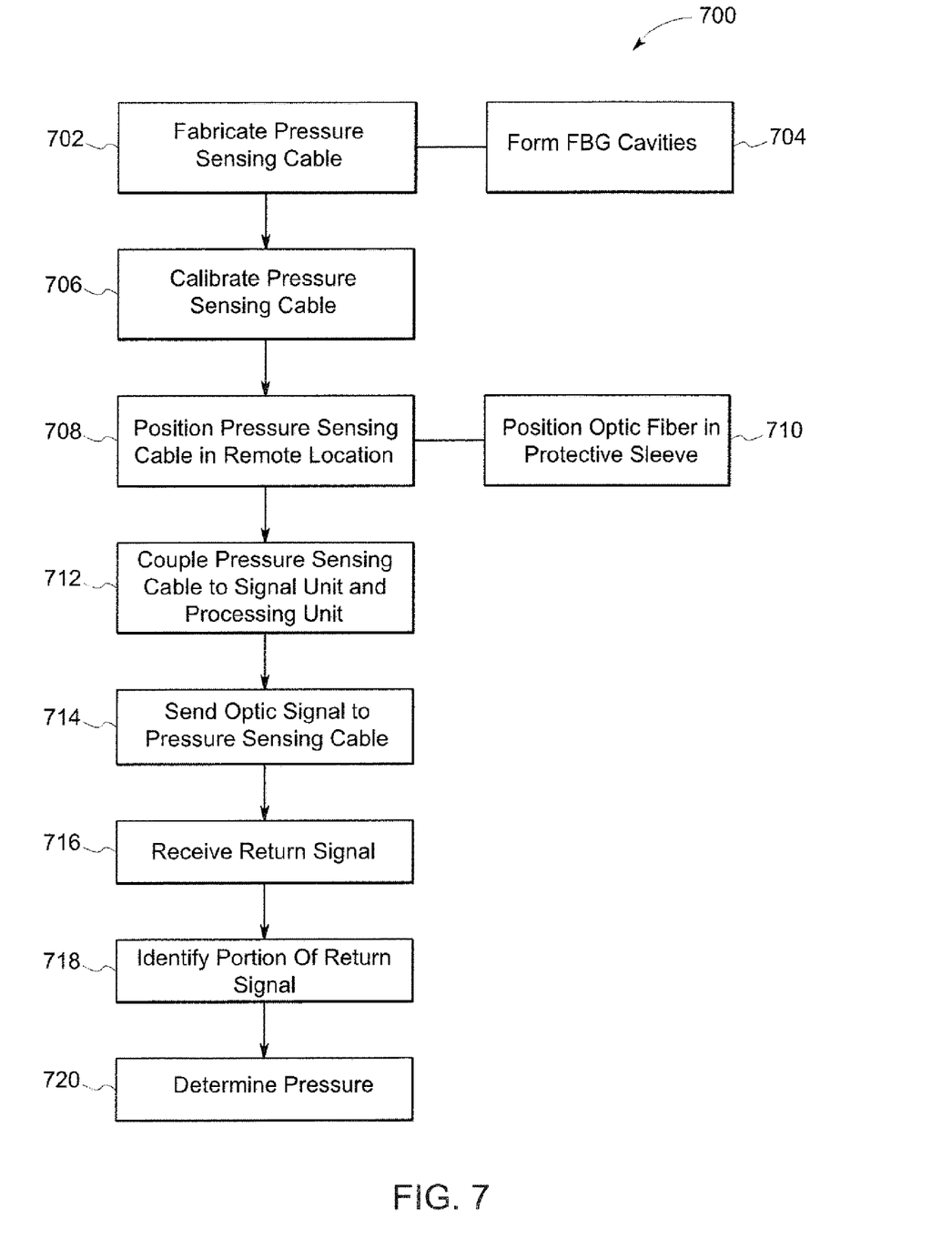
FIG. 7 is a flowchart of a method for determining pressure distributed along a cable in accordance with various embodiments.

FIG. 7 provides a flowchart of a method 700 for determining pressure at points or locations distributed along a length of a pressure sensing cable, for example pressure at different locations (e.g., depths) remote location (e.g., well) in which a pressure sensing cable is disposed. In various embodiments, the method 700, for example, may employ structures or aspects of various embodiments (e.g., systems and/or methods) discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. In various embodiments, portions, aspects, and/or variations of the method 700 may be able to be used as one or more algorithms to direct hardware to perform operations described herein.

At 702, a pressure sensing cable is fabricated. The pressure sensing cable is configured to have pressure dependent birefringence, as well as selective reflectivity at various predetermined locations along the length the cable. Thus, using changes in portions of signals associated with the predetermined locations along the length of the cable, changes in pressure exerted on the predetermined locations may be determined. For example, in various embodiments at 704, a FBG cavity is formed in the pressure sensing cable at each location along the length of the cable at which pressure is to be determined. Each FBG cavity in the illustrated embodiment is formed between a pair of FBG's, with the members of each pair of FBG's having at least a partial overlap of wavelength ranges at which the members of the pair are reflective. Further, the reflective wavelength ranges of the members of the FBG pair do not overlap with the reflective wavelength ranges of the members of other FBG pairs. Thus, each FBG pair and associated FBG cavity define a particular wavelength range uniquely associated with the particular FBG pair and associated FBG cavity.

At 706, the pressure sensing cable is calibrated. For example, the beat frequency or reflectance dip separation of a return signal from the pressure sensing cable may change with changes in pressure due to the birefringence of the pressure sensing cable. Thus, beat frequencies or reflectance dip separations may be determined at known pressures and correlated to the pressures to determine a calibration relationship from which pressure may be determined using beat frequency, for example, as an input. The calibration results may then be used, for example, by a determination unit, to determine pressures along the length of the pressure sensing cable based on beat frequencies for the FBG cavities disposed along the length of the pressure sensing cable. The calibration results may be used in a table form, for example, with weighted or averaged values for neighboring entries used for intermediate values not experimentally tested. As another example, the calibration data may be analyzed by curve-fitting or other analytic technique to develop a mathematical relationship between reflectance dip separation (and/or other aspects, properties, or characteristics of a return signal from the pressure sensing cable) and pressure. The calibration results may be in the form of constants and/or coefficients for use with a general equation for a given type or model of pressure sensing cable.

At 708, the pressure sensing cable is positioned in a remote location, such as a down-hole or well, for which measurement of pressure at various locations (e.g., depths of the down-hole or well) is desired to be determined. As one example, the remote location may be a geothermal well. As another example, the remote location may be an oil well or a well associated with hydraulic fracturing. In some embodiments, the pressure sensing cable may include an optic fiber that is first positioned in a protective sleeve (e.g., protective sleeve 250) at 710 before or during being positioned in the remote location. The pressure sensing cable may include one or more reference markings that may be used to associate the known or predetermined positions of the FBG cavities disposed along the length of the cable with particular locations (e.g., depths) of the remote location.

At 712, the pressure sensing cable is coupled to a signal unit (e.g., signal unit 120) and a processing unit (e.g., processing unit 130). The signal unit is configured to provide an optic signal to the pressure sensing cable, and the processing unit is configured to analyze a return signal including reflections of the optic signal from the pressure sensing cable to determine pressures for various locations in the remote location.

At 714, an optic signal is sent from the signal unit to the pressure sensing cable. The optic signal is configured to include the various wavelength ranges of the FBG cavities of the pressure sensing cable. For example, the optic signal may be a broadband optic signal. In some embodiments, the optic signal may include a laser that is tunable to scan across the various signature or characteristic wavelengths of the individual FBG cavities.

At 716, a return signal is received. The return signal includes the reflections of the optic signal (e.g., reflections from the FBG cavities of the optic fiber). In various embodiments, the return signal is provided to or otherwise acquired by the processing unit for signal processing (e.g., filtering, noise removal or reduction) and analysis.

At 718, a portion of the return signal corresponding to each FBG pair is identified based on a wavelength. In various embodiments, the portion of the return signal identified for a given FBG pair may be identified based on a characteristic or signature wavelength range that is unique to the FBG pair (e.g., all other FBG pairs of the pressure sensing cable are transmissive at the characteristic or signature wavelength range at which the given FBG pair is reflective).

At 720, a pressure corresponding to each FBG pair is determined using the portion of the return signal that corresponds to the FBG pair. In various embodiments, a reflectance dip separation for the portion of the return signal corresponding to each FBG pair may be used to determine the pressure for the corresponding FBG pair. For example, the pressure sensing cable may be calibrated by determining the reflectance dip separation at one or more known pressures and deriving a calibration relationship describing changes in pressure due to changes in reflectance dip separation. As each FBG pair is associated with a predetermined or otherwise known location (e.g., a predetermined location along the cable length where the FBG pair and associated FBG cavity are disposed, a known location in a remote location based on the position of the pressure sensing cable within the remote location), the pressures determined for each FBG pair may be associated with a corresponding location to provide a pressure distribution or pressure map listing the pressures at the various locations corresponding to the FBG pairs or cavities.

It should be noted that the particular arrangement of components (e.g., the number, types, placement, or the like) of the illustrated embodiments may be modified in various alternate embodiments. For example, in various embodiments, different numbers of a given module or unit may be employed, a different type or types of a given module or unit may be employed, a number of modules or units (or aspects thereof) may be combined, a given module or unit may be divided into plural modules (or sub-modules) or units (or sub-units), one or more aspects of one or more modules may be shared between modules, a given module or unit may be added, or a given module or unit may be omitted.

It should be noted that the various embodiments may be implemented in hardware, software or a combination thereof. The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid state drive, optic drive, and the like. The storage device may also be other similar means for loading computer programs or other instructions into the computer or processor.

As used herein, the term "computer," "controller," and "module" may each include any processor-based or microprocessor-based system including systems using microcontrollers, reduced instruction set computers (RISC), application specific integrated circuits (ASICs), logic circuits, GPUs, FPGAs, and any other circuit or processor capable of executing the functions described herein. The above examples are exemplary only, and are thus not intended to limit in any way the definition and/or meaning of the term "module" or "computer."

The computer, module, or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer, module, or processor as a processing machine to perform specific operations such as the methods and processes of the various embodiments described and/or illustrated herein. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program. The individual components of the various embodiments may be virtualized and hosted by a cloud type computational environment, for example to allow for dynamic allocation of computational power, without requiring the user concerning the location, configuration, and/or specific hardware of the computer system.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments, and also to enable a person having ordinary skill in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal languages of the claims.

What is claimed is:

1. A measurement system comprising:
 a pressure sensing cable comprising:
  a polarization maintaining (PM) optic fiber having a length; and
  plural Fiber Bragg Grating (FBG) pairs formed along the length of the optic fiber, each FBG pair comprising:
   a first FBG pair member formed at a location along the length of the optic fiber, the first FBG pair member defining a first wavelength range at which the first FBG pair member is reflective; and
   a second FBG pair member spaced a distance from the first FBG pair member to define a FBG cavity extending between the first FBG pair member and the second FBG pair member, the second FBG pair member defining a second wavelength range at which the second FBG pair member is reflective;
   wherein the first wavelength range of the first FBG pair member and the second wavelength range of the second FBG pair member of each pair at least partially overlap with each other but not with wavelength ranges of members of other FBG pairs;
 one or more processors operably coupled to the pressure sensing cable and configured to transmit an optic signal to the pressure sensing cable; and
 the one or more processors further configured to:
  receive a return signal including reflections of the optic signal transmitted to the pressure sensing cable, the reflections including a corresponding reflection from each of the FBG cavities of the FBG pairs;
  identify a portion of the return signal corresponding to each FBG pair based on the wavelength ranges of the members of each FBG pair;
  determine, using the portion of the return signal corresponding to each FBG pair, a pressure corresponding to the portion of the return signal identified for each FBG pair.

2. The measurement system of claim 1, wherein the processing unit is configured to determine the pressure corresponding to the portion of the return signal identified for each FBG pair using a reflectance dip separation of the portion of the return signal identified for each FBG pair.

3. The measurement system of claim 1, wherein each FBG pair is spaced at least about 10 meters from a nearest adjacent FBG pair.

4. The measurement system of claim 1, wherein the optic fiber includes at least two internal openings extending along the length of the optic fiber.

5. The measurement system of claim 1, wherein the first FBG pair member and the second FBG pair member of each FBG pair are spaced between about 0.5 centimeters and about 1.0 centimeters apart.

6. The measurement system of claim 1, wherein, for each FBG pair at least about 90% of the second wavelength range overlaps with the first wavelength range of the FBG pair.

7. The measurement system of claim 1, further comprising a protective sleeve extending along at least a portion of the length of the optic fiber, the protective sleeve comprising an outer shell and an inner material, the outer shell comprising openings at locations corresponding to the FBG pairs, the inner material comprising a pressure sensitive material configured to transmit pressure from a surrounding environment to the optic fiber proximate each FBG pair.

8. A method for measuring pressure at distributed locations comprising:
- transmitting, using a signal unit, an optic signal to a pressure sensing cable, the pressure sensing cable comprising:
  - a polarization maintaining (PM) optic fiber having a length; and
  - plural Fiber Bragg Grating (FBG) pairs formed along the length of the optic fiber, each FBG pair comprising:
    - a first FBG pair member formed at a location along the length of the optic fiber, the first FBG pair member defining a first wavelength range at which the first FBG pair member is reflective; and
    - a second FBG pair member spaced a distance from the first FBG pair member to define a FBG cavity extending between the first FBG pair member and the second FBG pair member, the second FBG pair member defining a second wavelength range at which the second FBG pair member is reflective;
    - wherein the first wavelength range of the first FBG pair member and the second wavelength range of the second FBG pair member of each pair at least partially overlap with each other but not with wavelength ranges of members of other FBG pairs;
- obtaining, at a processing unit, a return signal including reflections from the pressure sensing cable responsive to the optic signal transmitted using the signal unit, the reflections including a corresponding reflection from each of the FBG cavities of the FBG pairs;
- identifying, using the processing unit, a portion of the return signal corresponding to each FBG pair based on wavelength; and
- determining, using the processing unit, a pressure corresponding to each FBG pair using the corresponding portion of the return signal for each FBG pair.

9. The method of claim 8, wherein the determining the pressure corresponding to each FBG pair comprises using a reflectance dip separation for the portion of the return signal corresponding to each FBG pair to determine the pressure.

10. The method of claim 8, further comprising calibrating the pressure sensing cable at at least one known pressure, and wherein the determining the pressure corresponding to each FBG pair comprises using a predetermined relationship between a sensed value and a calibrated value.

11. The method of claim 8, further comprising positioning the pressure sensing cable in a protective sleeve, the protective sleeve extending along at least a portion of the length of the optic fiber, the protective sleeve comprising an outer shell and an inner material, the outer shell comprising openings at locations corresponding to the FBG pairs, the inner material comprising a pressure sensitive material configured to transmit pressure from a surrounding environment to the optic fiber proximate each FBG pair.

12. The method of claim 11, wherein the first FBG pair member and the second FBG pair member are spaced between about 0.5 centimeters and about 1.0 centimeters from each other, and wherein each FBG pair is spaced at least about 10 meters from a nearest adjacent FBG pair.

* * * * *